TIMING PULSE SYSTEM

Original Filed May 24, 1954

2 Sheets-Sheet 1

JERRY F. FOSTER
MARTIN H. SHULER
JAMES H. PAQUIN
INVENTORS.

BY James B. Christie

ATTORNEY

JERRY F. FOSTER
MARTIN H. SHULER
JAMES H. PAQUIN
INVENTORS.

BY James B. Christie

ATTORNEY

United States Patent Office 2,895,123

Patented July 14, 1959

2,895,123

TIMING PULSE SYSTEM

Jerry F. Foster, Pasadena, Martin H. Shuler, Los Angeles, and James H. Paquin, Arcadia, Calif., assignors to Burroughs Corporation, Detroit, Mich., a corporation of Michigan Continuation of application Serial No. 431,793, May 24, 1954. This application September 24, 1956, Serial No. 611,733

11 Claims. (Cl. 340—174)

This invention relates to apparatus for producing a plurality of sets of precisely synchronized sets of signals from a plurality of other sets of less precisely synchronized signals.

This application is a continuation of our co-pending application Serial No. 431,793, now abandoned, which was filed on May 24, 1954.

In digital computers and high speed data handling equipment it is common practice to employ a recording medium such as a magnetic drum, magnetic tape or punched paper for storing information for use in the equipment. In order to synchronize the operation of the computer or data handling equipment with movement of the recording medium, timing signals are derived from the recording medium and these signals are employed to control the operation of the computer or data handling equipment.

Usually a plurality of sets of timing signals is required, and it is difficult to record sets of signals on the recording medium so that the respective sets of timing signals which are derived from them are precisely synchronized.

This difficulty is overcome in the present invention by providing the required number of sets of signals on the recording medium and deriving a series of timing pulses from one of the sets of pulses. Gating means responsive to the other sets of signals on the recording medium serves to gate selected pulses of the series to provide the desired number of sets of pulses. Since the respective sets of pulses are derived from a single series of pulses, the sets of pulses are precisely synchronized with one another and they are more precisely synchronized with respect to one another than are the sets of signals which are carried on the recording medium.

In digital computers, a rotating magnetic drum is frequently employed to carry information which is recorded in tracks around the drum. Digits are recorded in sectors along the tracks, and the respective sectors are spaced predetermined distances from a zero reference on the magnetic drum. In order to synchronize the operation of the computer with movement of the magnetic drum, three sets of precisely synchronized signals may be required. By way of example, one of the sets may provide one signal per revolution of the drum for indicating the zero reference, another set may provide two hundred signals per revolution of the drum for indicating the sectors around the drum within which digits may be recorded, and the other set may provide signals for indicating the locations at which digits may be recorded within the respective sectors.

In accordance with a preferred embodiment of the invention, sets of magnetically recorded zero reference, sector and digit signals are provided on the magnetic drum. A master series of uniformly-spaced electrical pulses is derived from the magnetically-recorded digit siganls, and a gate circuit responsive to the set of magnetically-recorded sector signals gates all of the pulses of the master series except those which designate each sector to produce a set of pulses designating the locations at which digits may be recorded in the respective sectors. A second gating circuit responsive to the magnetically-recorded sector signals gates the pulses of the master series which designate each sector to produce a set of pulses designating the sectors around the drum in which digits may be recorded. A third gating circuit responsive to the magnetically-recorded zero reference signal gates the pulses of the master series which designate the zero reference to provide one zero pulse per revolution of the drum.

Thus, the three sets of timing pulses which are derived from the magnetically-recorded signals on the rotating drum are more precisely synchronized with respect to one another than are the magnetically-recorded signals.

The invention is explained with reference to the drawings, in which:

Fig. 1 shows a system for generating precisely synchronized timing pulses for synchronizing the operation of a digital computer with the rotation of a magnetic drum.

Figure 1:
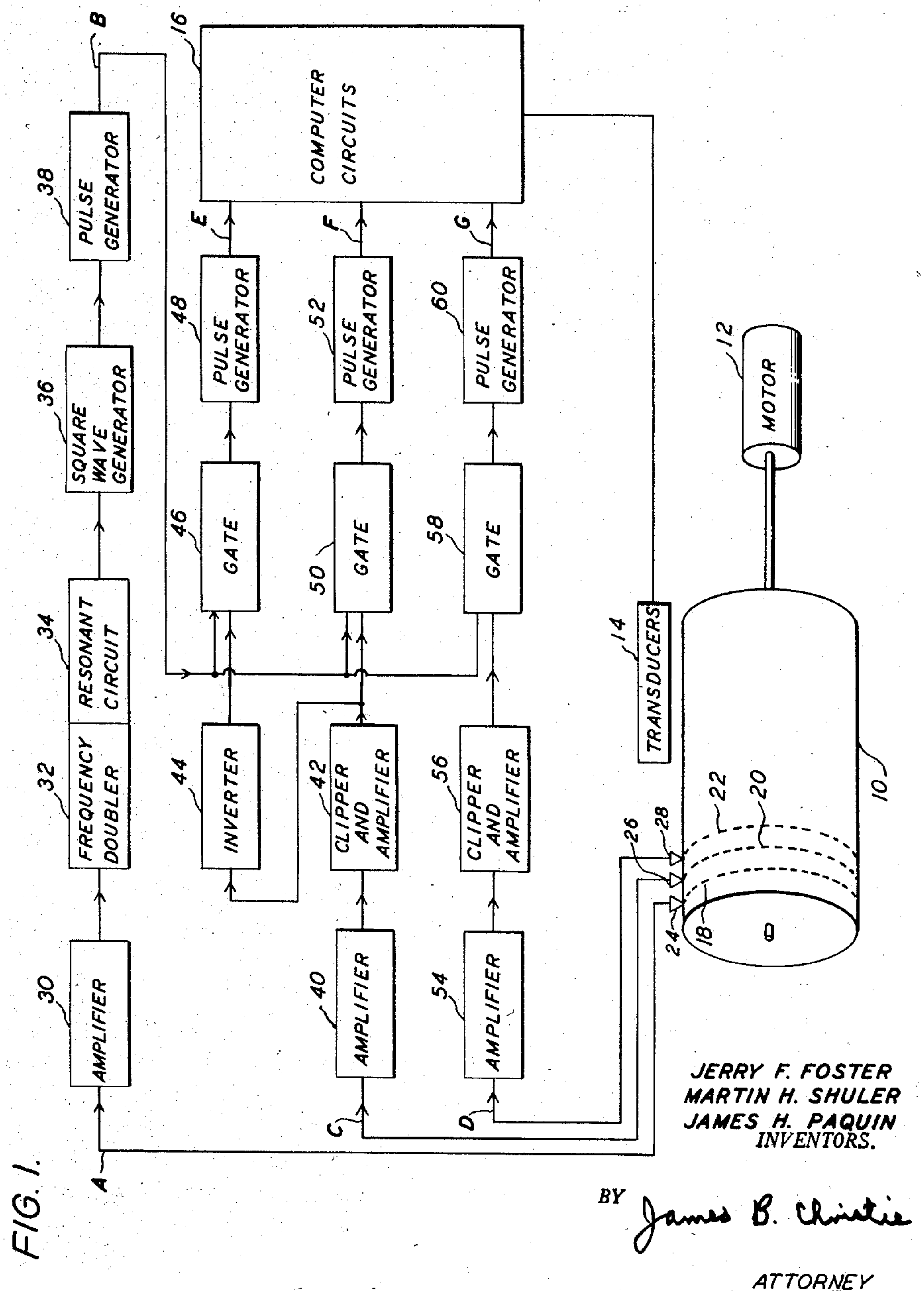
Fig. 1 is a diagram showing the system for generating timing signals.

The magnetic drum is rotated at a substantially constant speed by a motor 12, and digital information is recorded on or read from selected tracks at selected locations around the drum by means of a plurality of transducers 14 which are coupled to suitable computer circuits 16.

The timing pulse system of the present invention may be employed in various types of apparatus, and the transducers 14 and the computer circuits 16 are shown merely as blocks in order to illustrate the timing system of the present invention.

Three sets of signals are magnetically recorded along tracks 18, 20 and 22 on the magnetic drum, with the track 18 carrying signals which correspond to the locations around the drum at which digits may be recorded, the track 20 carrying signals which designate the sectors around the drum in which digits may be recorded, and the track 22 carrying a signal for providing a zero reference on the magnetic drum. By way of example, the track 18 may carry 1200 magnetic signals, the track 20 may carry 200 magnetic signals and the track 22 may carry 1 magnetic signal.

Figure 2:
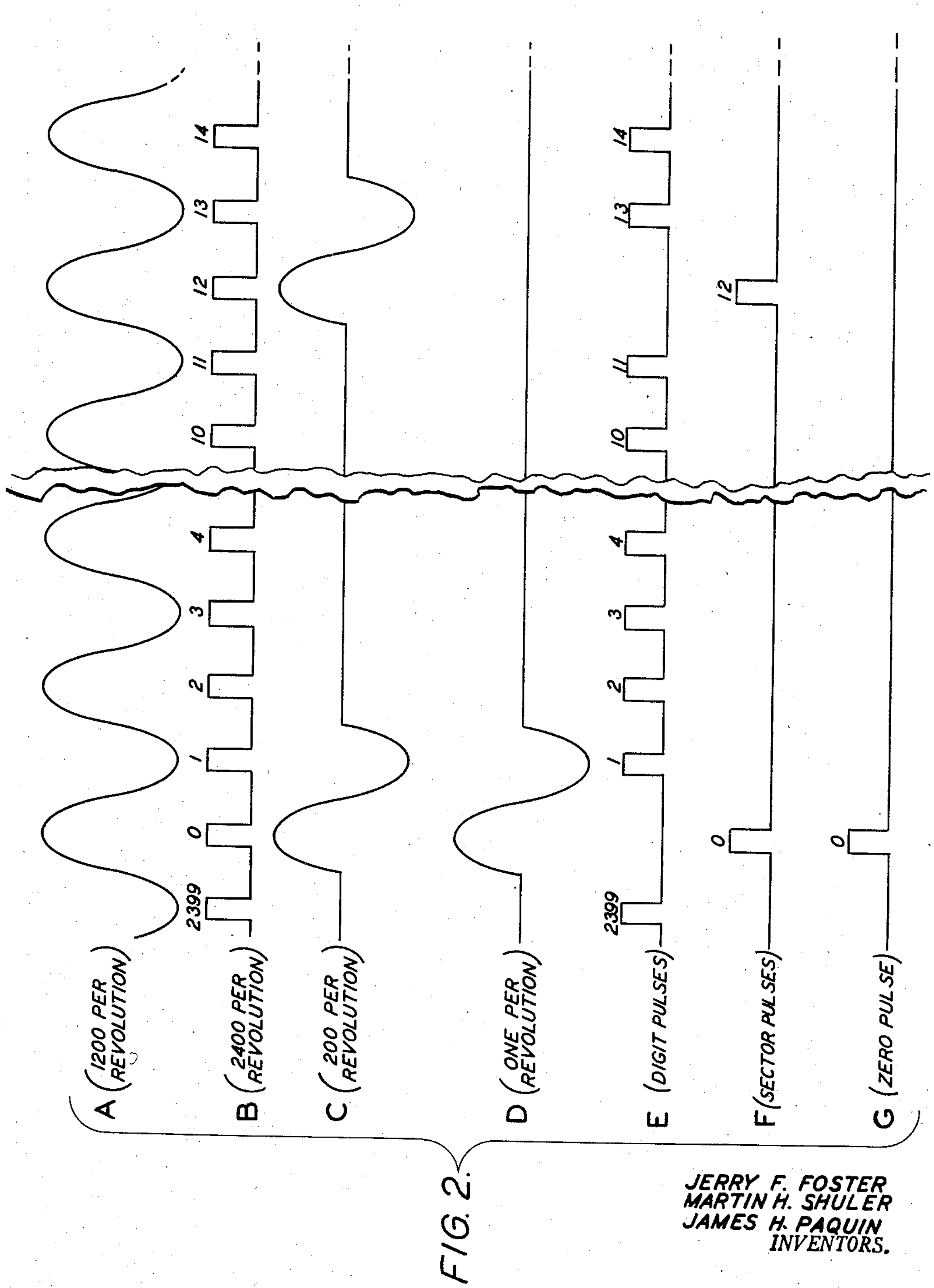
Fig. 2 shows signals which are produced in the apparatus of Fig. 1, with the letters which designate each set of signals in Fig. 2 corresponding to the letters in Fig. 1 and showing the circuits of Fig. 1 which carry the respective signals.

The magnetic signals in these three tracks around the drum are sensed by transducers 24, 26 and 28 to provide sine-wave signals of the type shown in curves A, C and D of Fig. 2.

The signal A which is derived from the track 18 comprises 1200 sine-wave cycles per revolution of the drum. This signal is amplified by an amplifier 30 and then applied to a frequency doubler 32, which produces a 2400 cycle signal. Preferably the frequency doubler is a type which employs a resonant circuit, such as the circuit 34. Such a resonant circuit arrangement reduces the non-uniformity of the sine-wave signals and thereby increases the timing precision of the signal.

A ferquency doubling arrangement is not necessary if a 2400 cycle signal is derived from the track 18. However, the doubling arrangement disclosed in the drawings is preferable because it reduces the number of signals that must be provided on the track 18 and because the resonant circuit of the doubler increases the timing precision of the signal which is derived from the track.

The 2400 cycle signal is then applied to a square-wave generator 36 which shapes the sine-waves into square waves, and the output of this generator is applied to a pulse generator 38 which produces a series of narrow pulses B. These pulses are uniformly spaced, and 2400 pulses are produced per revolution of the magnetic drum. These pulses are employed as a master series of pulses and the three desired sets of pulses are obtained by gating selected pulses of the master series.

The signals C which are derived from the track 20 comprise 200 sine-wave signals per revolution of the magnetic drum. They are amplified by an amplifier 40 and applied to a clipper and amplifier 42 which produces output signals for controlling the operation of gating circuits. The output of the clipper and amplifier 42 is applied to an inverter 44, which provides an output signal which closes a normally open gate 46 during each positive half-cycle of the signals C. Thus, selected pulses of the master series B are applied through the gate 46 to a pulse generator 48 which produces a series of 11 digit pulses E during the interval of time between successive signals C. The pulses E designate the locations within each sector at which digits may be recorded.

The output of the clipper and amplifier 42 is also applied to a normally closed gate 50, and it serves to open the gate during each positive half-cycle of the signals C. Thus, selected pulses of the master series B are applied through the gate 50 to a pulse generator 52 which produces a series of 200 sector pulse signals F during each revolution of the magnetic drum.

The signals D which are derived from the track 22 comprise 1 sine-wave signal per revolution of the magnetic drum. They are amplified by an amplifier 54 and applied to a clipper and amplifier 56 which produces signals for opening a normally closed gate 58 during each positive half-cycle of the signals D. Thus, selected pulses of the master series B are applied through the gate 58 to a pulse generator 60 which produces one zero reference pulse G during each revolution of the magnetic drum.

Since the sets of timing pulses E, F and G are all derived from the series of master pulses B, these three sets of pulses are more precisely synchronized with respect to one another than are the corresponding three sets of signals which are magnetically recorded in the tracks 18, 20 and 22. Hence, by employing the apparatus of the present invention, it is possible to obtain synchronization between sets of timing signals which could not be obtained if the sets of timing signals were derived directly from signals on the recording medium.

We claim:

1. Apparatus for producing precisely synchronized sets of pulses, comprising a recording medium having a plurality of sets of signals recorded in substantial registration thereon, means responsive to one of the sets of signals for producing a master series of pulses, and means responsive to the other signals on the recording medium for gating selected pulses of the master series of pulses to provide a plurality of sets of pulses in identical registration which are thereby more precisely synchronized with one another than the sets of signals on the recording medium.

2. Apparatus for producing precisely synchronized sets of pulses, comprising a recording medium having a plurality of sets of signals recorded in substantial registration thereon, means including a resonant circuit responsive to one of the sets of signals for producing a master series of pulses, and means responsive to the other signals on the recording medium for gating selected pulses of the master series of pulses to provide a plurality of sets of pulses in identical registration which are thereby more precisely synchronized with one another than the sets of signals on the recording medium.

3. Apparatus for producing precisely synchronized sets of pulses, comprising a recording medium having three sets of signals recorded in substantial registration thereon with one of the sets having more signals than the other two sets, pulse generating means responsive to said one set of signals for producing a master series of pulses, and means responsive to the other two sets of signals for gating the pulses of the master series of pulses which occur coincident with the signals of the two sets to provide sets of pulses in identical registration which are thereby precisely synchronized with one another.

4. Apparatus for producing precisely synchronized sets of pulses, comprising a recording medium having a plurality of sets of similar signals recorded thereon with one set having more signals than the other sets, means responsive to said one set of signals for producing a master series of pulses corresponding to the signals of said one set, and means responsive to each of the other sets of signals on the recording medium for gating selected pulses of the master series of pulses to provide a plurality of sets of pulses which correspond to the sets of signals on the recording medium but which are more precisely synchronized with one another than the sets of signals on the recording medium.

5. Apparatus for producing precisely synchronized sets of pulses, comprising a recording medium having a plurality of sets of similar signals recorded thereon with one set having more signals than the other sets, means responsive to said one set of signals and including a frequency multiplier for producing a master series of pulses corresponding to the signals of said one set, and means responsive to each of the other sets of signals on the recording medium for gating selected pulses of the master series of pulses to provide a plurality of sets of pulses which correspond to the sets of signals on the recording medium but which are more precisely synchronized with one another than the sets of signals on the recording medium.

6. Apparatus for producing precisely synchronized sets of pulses, comprising a recording medium having three sets of signals recorded thereon with one of the sets having more signals than the other sets and with the second set having more signals than the third set, pulse generating means responsive to said one set of signals for producing a master series of pulses corresponding to the signals of said one set, means responsive to the second set of signals for gating all of the pulses of the master series except the pulses which occur coincident with the signals of the second set, means also responsive to the second set of signals for gating the pulses of the master series which occur coincident with the signals of the second set, and means responsive to the third set of signals for gating the pulses of the master series which occur coincident with the signals of the third set, so that three sets of gated pulses are produced with the sets of gated pulses being more precisely synchronized than the corresponding sets of signals on the recording medium.

7. Apparatus for producing precisely synchronized sets of pulses, comprising a movable recording medium having three sets of signals recorded thereon with one of the sets having more signals than the other sets and with the second set having more signals than the third set, a frequency doubler having a resonant circuit responsive to said one set of signals for producing a series of sine-wave signals having double the frequency of the signals of said one set, pulse generating means coupled to the output of the frequency doubler for producing a master series of pulses, means responsive to the second set of signals for gating all of the pulses of the master series except the pulses which occur coincident with the signals of the second set, means also responsive to the second set of signals for gating the pulses of the master series which occur coincident with the signals of the second set, and means responsive to the third set of signals for gating the pulses of the master series which occur coincident with the signals of the third set, so that three sets of gated pulses are produced with the sets of gated pulses being more precisely synchronized than the corresponding sets of signals on the recording medium.

8. Apparatus for producing precisely synchronized sets of pulses, comprising a rotatable drum having three sets of timing signals recorded in tracks extending around the drum for designating the locations around the drum at which signals representing digital information may be located in other tracks, the first set of timing signals serving to designate the locations around the drum at which signals representing digits may be recorded, the second set of timing signals serving to designate sectors around the drum in which the signals representing digits may be recorded, and the third set of timing signals serving as the zero reference and having only one signal in a track around the drum, means responsive to the first set of timing signals for producing a master series of pulses synchronized with the signals of the first set, means responsive to the second set of timing signals for gating all of the pulses of the master series except the respective pulses which designate each sector to produce a set of pulses designating the locations at which digits may be recorded in the respective sectors, means also responsive to the second set of timing signals for gating the pulses of the master series which designate each sector to produce a set of pulses designating the sectors around the drum in which digits may be recorded, and means responsive to the third set of timing signals for gating one of the pulses of the master series during each rotation of the drum to produce a zero reference pulse, whereby the sets of pulses which correspond to the sets of timing signals on the drum are more precisely synchronized with one another than are the sets of timing signals on the drum.

9. Apparatus for producing precisely synchronized sets of pulses, comprising a rotatable drum having three sets of timing signals recorded in tracks extending around the drum for designating the locations around the drum at which signals representing digital information may be located in other tracks, the first set of timing signals serving to designate the locations around the drum at which signals representing digits may be recorded, the second set of timing signals serving to designate the sectors around the drum in which the signals representing digits may be recorded, and the third set of timing signals serving as the zero reference and having only one signal in a track around the drum, means including a resonant circuit responsive to the first set of timing signals for producing a master series of pulses synchronized with the signals of the first set, means responsive to the second set of timing signals for gating all of the pulses of the master series except the respective pulses which designate each sector to produce a set of pulses designating the locations at which digits may be recorded in the respective sectors, means also responsive to the second set of timing signals for gating the pulses of the master series which designate each sector to produce a set of pulses designating the sectors around the drum in which digits may be recorded, and means responsive to the third set of timing signals for gating one of the pulses of the master series during each rotation of the drum to produce a zero reference pulse, whereby the sets of pulses which correspond to the sets of timing signals on the drum are more precisely synchronized with one another than are the sets of timing signals on the drum.

10. Apparatus for producing precisely synchronized sets of pulses, comprising a rotatable drum having three sets of timing signals recorded in tracks extending around the drum for designating the locations around the drum at which signals representing digital information may be located in other tracks, the first set of timing signals serving to designate the locations around the drum at which signals representing digits may be recorded, the second set of timing signals serving to designate sectors around the drum in which the signals representing digits may be recorded, and the third set of timing signals serving as the zero reference, means responsive to the first set of timing signals for producing a master series of pulses synchronized with the signals of the first set, means responsive to the second set of timing signals for gating all of the pulses of the master series except the respective pulses which designate each sector to produce a set of pulses designating the locations at which digits may be recorded in the respective sectors, means also responsive to the second set of timing signals for gating the pulses of the master series which designate each sector to produce a set of pulses designating the sectors around the drum in which digits may be recorded, and means responsive to the third set of timing signals for gating one of the pulses of the master series during each rotation of the drum to produce a zero reference pulse, whereby the sets of pulses which correspond to the sets of timing signals on the drum are more precisely synchronized with one another than are the sets of timing signals on the drum.

11. Apparatus for producing precisely synchronized sets of pulses, comprising a rotatable drum having three sets of timing signals recorded in tracks extending around the drum for designating the locations around the drum at which signals representing digital information may be located in other tracks, the first set of timing signals serving to designate the locations around the drum at which signals representing digits may be recorded, the second set of timing signals serving to designate the sectors around the drum in which the signals representing digits may be recorded, and the third set of timing signals serving as the zero reference, means including a resonant circuit responsive to the first set of timing signals for producing a master series of pulses synchronized with the signals of the first set, means responsive to the second set of timing signals for gating all of the pulses of the master series except the respective pulses which designate each sector to produce a set of pulses designating the locations at which digits may be recorded in the respective sectors, means also responsive to the second set of timing signals for gating the pulses of the master series which designate each sector to produce a set of pulses designating the sectors around the drum in which digits may be recorded, and means responsive to the third set of timing signals for gating one of the pulses of the master series during each rotation of the drum to produce a zero reference pulse, whereby the sets of pulses which correspond to the sets of timing signals on the drum are more precisely synchronized with one another than are the sets of timing signals on the drum.

No references cited.